United States Patent [19]
Knollman

[11] Patent Number: 6,069,950
[45] Date of Patent: May 30, 2000

[54] DUAL-LIMIT CURRENT-LIMITING BATTERY-FEED CIRCUIT FOR A DIGITAL LINE

[75] Inventor: Dieter J. H. Knollman, Arvada, Colo.

[73] Assignee: Lucent Technologies Inc., Murray Hill, N.J.

[21] Appl. No.: 08/965,628

[22] Filed: Nov. 6, 1997

[51] Int. Cl.⁷ .................................................. H04M 19/00
[52] U.S. Cl. .......................... 379/413; 379/399; 379/402; 379/404; 379/412; 361/93
[58] Field of Search ..................................... 379/413, 399, 379/324, 322, 402, 403, 404, 412; 320/127, 162, 163, 165; 307/131; 361/93, 100, 58, 18, 115; 327/309, 320, 322; 323/352, 353, 354

[56] References Cited

U.S. PATENT DOCUMENTS

| | | | |
|---|---|---|---|
| 4,007,335 | 2/1977 | Hetherington et al. | 379/413 |
| 4,419,542 | 12/1983 | Embree et al. | 379/377 |
| 4,533,970 | 8/1985 | Brown | 361/58 |
| 4,560,834 | 12/1985 | Huft | 179/16 |
| 4,577,064 | 3/1986 | Huft et al. | 379/413 |
| 4,612,417 | 9/1986 | Toumani | 379/413 |
| 4,736,415 | 4/1988 | McNeill et al. | 379/413 |
| 5,089,927 | 2/1992 | Bulan et al. | 361/87 |
| 5,333,196 | 7/1994 | Jakab | 379/413 |
| 5,444,777 | 8/1995 | Condon et al. | 379/413 |
| 5,528,688 | 6/1996 | Schorr | 379/413 |
| 5,854,550 | 12/1998 | Knollman | 379/413 |

FOREIGN PATENT DOCUMENTS 9219062 10/1992 WIPO .............................. H04M 1/76

OTHER PUBLICATIONS

*Designer's™ Data Sheet* SMARTDISCRETES™ Internally Clamped, Current Limited N–Channel Logic Level Power MOSFET, Motorola, Inc. 1996, Document MLP2N06CL/D, pp. 1–6.

*TMOS Power MOSFET Transistor Device Data*, Motorola, Inc., 1994, Document DL135/D REV5, pp. 2–11–1–2–11–4.

*Primary Examiner*—Forester W. Isen
*Assistant Examiner*—Jacques M. Saint-Surin
*Attorney, Agent, or Firm*—David Volejnicek

[57] ABSTRACT

A current-limiting circuit (110) of a battery-feed circuit (FIG. 1) for a digital telecommunications line (T,R) provides a low start-up current limit (I3) when power is initially applied to the digital line. It automatically and gradually changes (40) to a high current limit (I1) as the load on the line is charged. When the load is fully charged, the circuit provides a low impedance to the line. Upon occurrence of a fault, the circuit switches back to the initial low current-limit state. The circuit comprises a feed transistor (Q1, Q11), a control transistor (Q2, Q12), and a high-impedance resistive circuit (R1–R4, R15). The feed transistor limits (403) current flowing to the R lead of the line to the high limit when the voltage across the feed transistor is low (0–V2) and the feed transistor is saturated. The control transistor partially turns off the feed transistor when the voltage is intermediate (V2–V4) causing the feed transistor to provide (402) an intermediate current that is inversely proportional to the voltage across the feed transistor. When the voltage across the feed transistor is high (V4), the control transistor turns the feed transistor off and the resistive circuit supplies (401) the low current to the R lead.

11 Claims, 2 Drawing Sheets

DUAL-LIMIT CURRENT-LIMITING BATTERY-FEED CIRCUIT FOR A DIGITAL LINE

TECHNICAL FIELD

This invention relates generally to telephony line interface circuits, and specifically to current-limiting battery feed circuits of digital-line interface circuits.

CROSS-REFERENCE TO RELATED APPLICATION

Application of D. J. H. Knollman, entitled "Transformerless Digital-Line Battery Feed Circuit", filed on even date herewith.

BACKGROUND OF THE INVENTION

A line interface circuit couples a telephone line to a telephone switching system. Among other things, it serves to provide both AC and DC power to the telephone line to operate the communication equipment (e.g., telephone) that is connected to the line. This function of supplying the DC power is performed by the battery feed circuit of the line interface circuit.

A variety of battery feed circuits have been used over time. The most common design, shown in FIG. 1, employs a large primary inductor 100 coupled to a source of AC signals and with two secondary windings 101, 102 (e.g., a transformer), one connected from the tip lead T of the telephone line to ground and the other connected from the ring lead R through a current limiter 110 to a power supply V1 (e.g., a battery). The two windings are closely coupled through a capacitor 111, whereby a high impedance is presented to differential signals on the tip and ring leads of the telephone line and a low impedance is presented to common-mode (longitudinal) signals. The load (e.g., a telephone terminal and its DC-to-DC converter circuit) seen by the battery feed circuit across tip and ring leads T and R is largely a capacitive load. Capacitive loads create large start-up currents when power is initially applied to them. The function of current limiter 110 is to limit start-up (in-rush) current surges.

In order for current limiter 110 to not interfere with the proper operation of the load, the current limit must be at least as large as the maximum operating load current. But while the voltage drop across the current limiter is relatively small during normal operation, almost the entire voltage produced by source V1 is seen as a voltage drop across the current limiter during start-up and during short-circuit faults on the telephone line. Yet at the same time, the impedance of the current limiter must be kept small in order for source V1 to supply to tip and ring leads T and R the constant-voltage feed required by digital telephone lines. Consequently, the current limiter dissipates relatively a lot of power during start up, and therefore must be robust and bulky to handle that power dissipation. This results in the current limiter being rather expensive.

To avoid the large power dissipation at start-up, some current-limiter designs employ power sequencing. Power sequencing is involves the use of a series of current-source stages of decreasing impedance which are switched on in sequence as the voltage drop across the current limiter decreases. Thus, when the voltage drop across the current limiter is large, the current is supplied through the high-impedance stage, whereby the current is relatively small and therefore the power dissipation is also relatively small. As the voltage drop decreases, lower-impedance stages are switched on, whereby the current flow is increased, but because the voltage decreases at the same time as the current increases, the power dissipation stays relatively small. While effective in limiting power dissipation, such power-sequences are rather complex and expensive.

SUMMARY OF THE INVENTION

In accordance with the invention, a technical advance in the art is achieved by a dual-limit current-limiting circuit of a battery feed circuit for a digital communications line. The dual-limit current-limiting circuit provides a relatively low current-limit for start-up surges and faults (shorts), and a relatively high current-limit for normal operating-load currents. The current-limiting circuit comprises a feed transistor, a control transistor, and a high-impedance circuit. The feed transistor couples a source of power (e.g., a battery) to a lead (e.g., the ring lead) of the digital communications line and limits the amount of current flowing between the power source and the lead to below a first value when the voltage across the feed transistor is below a second value. The control transistor is connected to the feed transistor and causes the feed transistor to supply an amount of current to the lead that is less than the first value and greater than a third value and inversely proportional to the voltage across the feed transistor when the voltage is above the second value and below a fourth value, and further causes the feed transistor to cease supplying current to the lead when the voltage across the feed transistor is above the fourth value. The high-impedance (e.g., resistive) circuit couples the power source to the lead in parallel with the feed transistor, and supplies an amount of current to the lead that is less than the third value when the voltage is above the fourth value. Illustratively, the feed transistor is saturated when the voltage across it is below the second value, the control transistor partially turns off the feed transistor when the voltage across the feed transistor is between the second and the fourth values, and the control transistor keeps the feed transistor turned off when the voltage across the feed transistor is above the fourth value. Also illustratively, the control transistor forms a part of the high-impedance circuit, serving as an on/off gate for current to at least a portion of the high-impedance circuit.

The dual-limit current-limiting circuit provides a low start-up current limit when power is initially applied to the digital line. It automatically and gradually changes to a high current limit as the load on the line is charged. When the load is fully charged, the circuit provides a low impedance to the line. Upon occurrence of a fault, e.g., a short, the circuit switches back to the initial low current-limit state. The circuit eliminates the need for expensive and complex power sequencing. It is simple and low-cost to implement.

These and other advantages and features of the invention will become more apparent from the following description of an illustrative embodiment of the invention considered together with the drawing.

DETAILED DESCRIPTION

Figure 1:
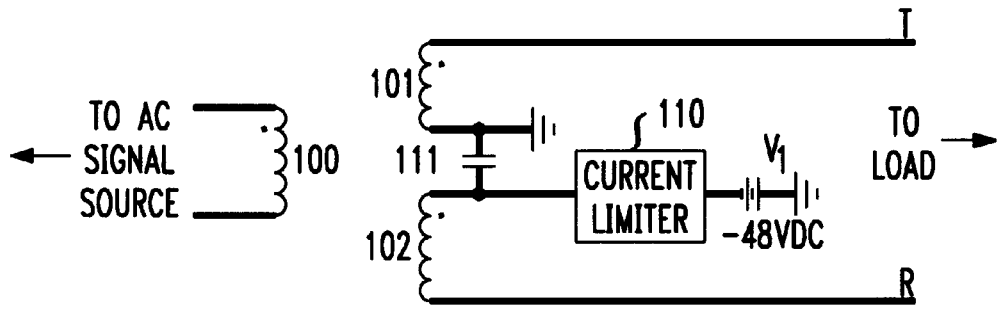
FIG. 1 is a schematic diagram of a conventional digital-line battery feed circuit.

FIG. 1 shows a conventional battery-feed circuit 100 of a telephone line-interface circuit. Circuit 100 includes a conventional current limiter 110. In contrast, FIGS. 2 and 3 show alternative embodiments of current limiter 110 constructed according to the principles of the invention.

Figure 2:
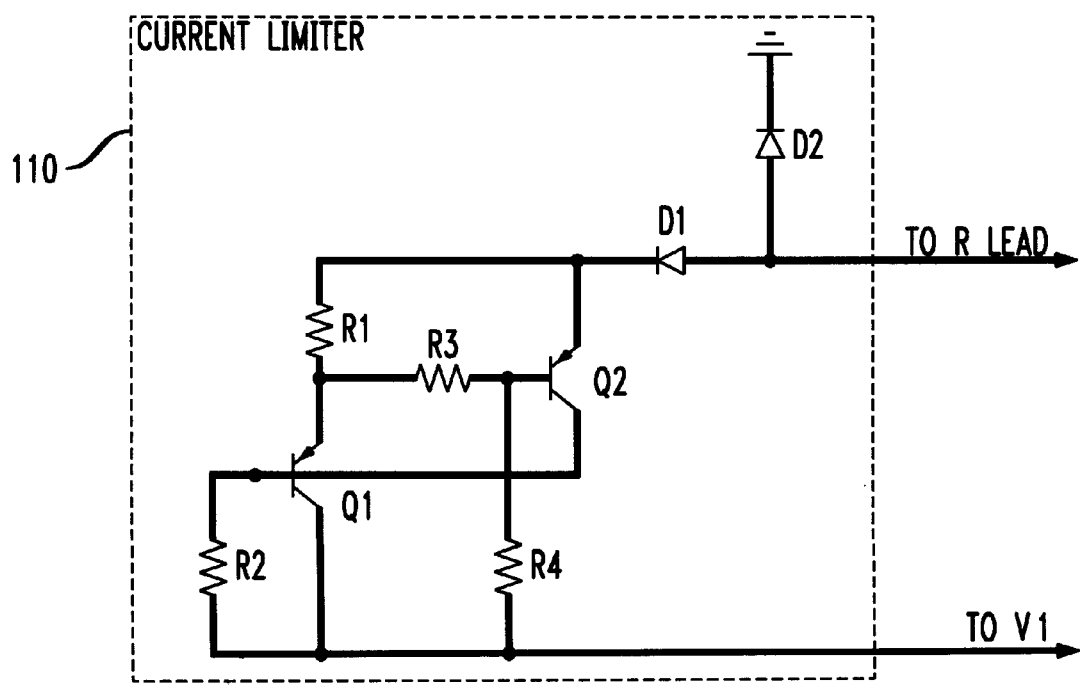
FIG. 2 is a schematic diagram of a current limiter of the circuit of FIG. 1 which implements a first illustrative embodiment of the invention.
Figure 3:
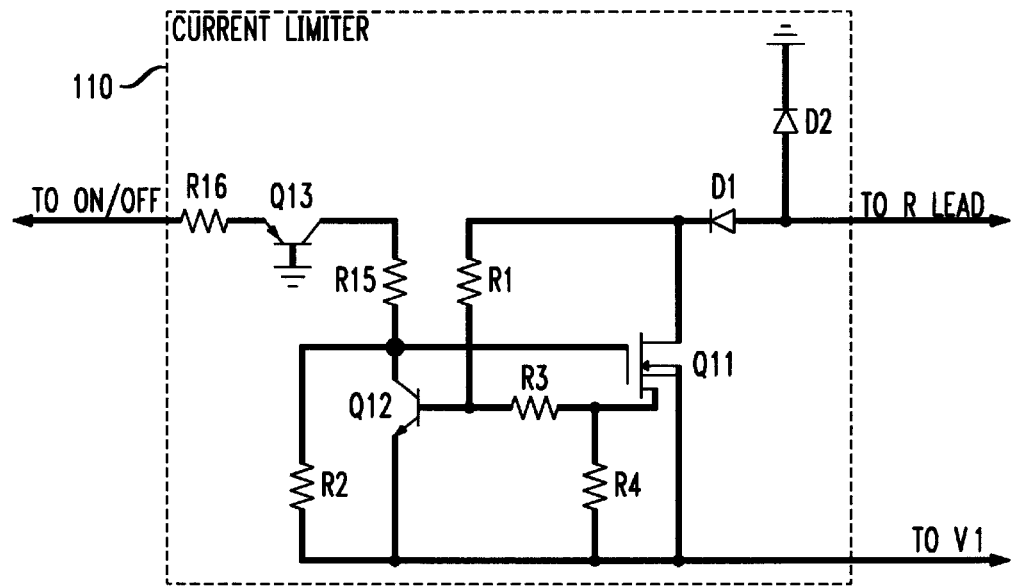
FIG. 3 is a schematic diagram of a current limiter of the circuit of FIG. 1 which implements a second illustrative embodiment of the invention.

Turning to FIG. 2, current limiter 110 includes a transistor Q1 biased by resistors R1 and R2 which functions as a current feed for ring lead R. Transistor Q1 is a high-gain PNP transistor that has its collector connected to battery V1, its base connected through a resistor R2 to battery V1, and its emitter connected through a resistor R1 to ring lead R. Illustratively, transistor Q1 is a Darlington pair. When transistor Q1 is turned on, it reduces the effective impedance of circuit 110 by the transistor gain HFE. Thus, the DC feed impedance becomes R2/HFE(Q1)+R1.

Since this current feed is a resistive feed circuit, it supplies maximum current when the voltage across the circuit is maximum, and a progressively lower current at progressively lower voltages. But this is the opposite of what is desired: an ideal circuit would supply minimum current to faults, such as shorts between ring lead R and either ground GND or tip lead T, and would supply full current under normal operating conditions when the voltage drop across the circuit is small. The current feed circuit is therefore modified to provide an approximation of the ideal circuit, namely, to limit both the current through the feed transistor Q1 and the voltage across that transistor. This is effected by providing transistor Q1 with an appropriate control circuit implemented as follows.

In one implementation, shown in FIG. 2, transistor Q1 is supplemented with an PNP transistor Q2 whose collector is connected to the base of transistor Q1, whose base is connected through resistor R4 to battery V1 and through resistor R3 to the emitter of transistor Q1, and whose emitter is connected to ring lead R. Transistor Q2 is a protection transistor for feed transistor Q1. The protection transistor Q2 turns on if the current through feed transistor Q1 is above a limit value or if the voltage across feed transistor Q1 exceeds a limit value. The current limit is set by resistor R1. If the voltage drop across resistor R1 is greater than the base-emitter turn-on voltage (VBE) of transistor Q2, transistor Q2 turns on and diverts current from the base of transistor Q1 to limit the current through transistor Q1 to the value of VBE/R1. Voltage limiting is performed for transistor Q1 by resistors R3 and R4. If the voltage divider formed by resistor R4 and resistors R1 and R3 creates a VBE drop across resistors R1 and R3, transistor Q2 turns on and transistor Q1 turns off. Transistor Q1 can be on only if the voltage across transistor Q1 is less than VBE·R4/(R1+R3). The current and voltage limits thus depend on VBE.

VBE varies with temperature: an increase in temperature results in a decrease in VBE and hence a decrease in the current and voltage limits, and vice versa. This effect tends to stabilize circuit operation by inhibiting thermal runaway.

It is also desirable to protect the battery feed circuit against voltage surges on ring lead R. For this purpose, ring lead R is connected through a diode D2 to ground GND. If a positive voltage surge appears on ring lead R, it is diverted by diode D2 to ground; if a negative voltage surge appears on ring lead R, it is blocked by diode D1.

Figure 4:
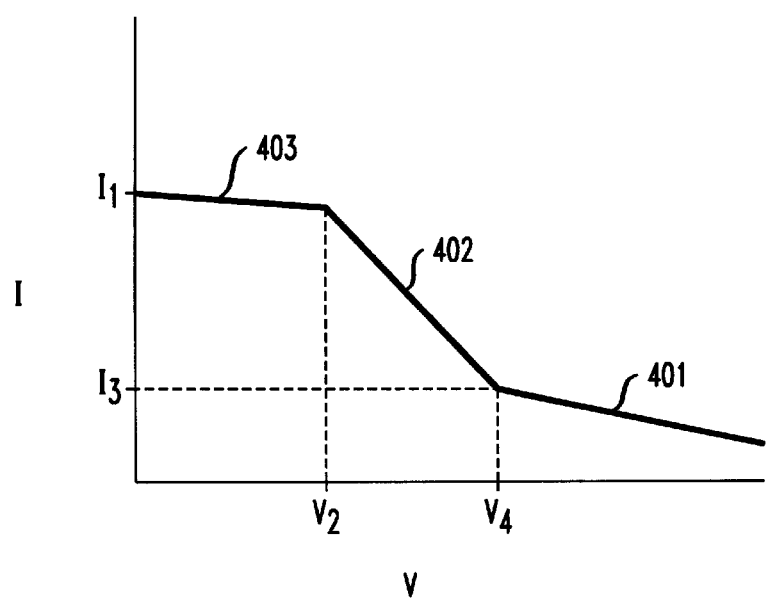
FIG. 4 is a current v. voltage diagram of the operating characteristic of the current limiters of FIGS. 2 and 3.

The above-described circuit has the following three states: a state in which feed transistor Q1 is turned off (off state); a state in which feed transistor Q1 is current limiting (current limit state); and a state in which feed transistor Q1 reduces the effective resistive feed value (resistive feed state). These states correspond to the regions 401, 402, and 403, respectively, of the current v. voltage operational characteristic of current limiter 110 which is shown in FIG. 4.

For start-up conditions and faults, a large voltage is present across feed transistor Q1, and so protection transistor Q2 turns feed transistor Q1 off (off state). Feed current then flows to ring lead R via resistors R2 and R4 and transistor Q2. In the off state, the current is limited to a value below I3 in FIG. 4 by resistors R1, R2, and R4, with resistor R2 playing the determinative role. Transistor Q2 is saturated via resistor R4.

After the telephone line charges and the voltage between V1 and R lead drops to a value below V4 in FIG. 4, the voltage across feed transistor Q1 is insufficient to keep protection transistor Q2 saturated, and so current starts to flow through feed transistor Q1. This current is limited to a value between I3 and I1 in FIG. 4 by the combination of voltage and current across transistor Q1 (current limit state), in which R1 plays the determinative role. As the voltage decreases, the current is allowed to increase up to the current limit value of I1. In this state, feed transistor Q1 limits the current delivered to the load.

After the telephone line is fully charged, the voltage between V1 and R lead drops to a value below V2 in FIG. 4. When the line current drops below the current limit value I1, protection transistor Q2 turns off, and feed transistor Q1 decreases the effective feed resistance by its gain (resistive feed state).

If the load current attempts to exceed the limit value I1, protection transistor Q2 starts to turn on and diverts some of the base current from feed transistor Q1. This forces the voltage across feed transistor Q1 to increase in an attempt to limit the current. The increase in voltage past a value of V2 initially reduces the effective current limit value and eventually turns feed transistor Q1 off when the voltage becomes sufficiently large, at a value of V4.

In the case of a short between ring lead R and either ground GND or tip lead T, excessive voltage is present across feed transistor Q1, and protection transistor Q2 turns that feed transistor off, with the resistor pair R2 and R4 limiting the short circuit current. These resistors need to sustain shorts for indefinite periods of time.

The circuit can sustain shorts indefinitely, and automatically starts up when a fault is removed. Hence, it does not require microprocessor control.

The load presented by a digital telephone set to line 100 typically consists of a large capacitance and a DC-to-DC converter. The capacitance initially appears to the battery feed circuit as a short from tip lead T to ring lead R. Therefore, at start up, the battery feed circuit sees a large voltage drop and enters the off state, shutting down feed transistor Q1. The start-up current is set by resistor R2 in parallel with resistor R4. In-rush current limiting is not needed, because the start-up current is actually less than the operating current. The current charges the capacitance of the set, and after the capacitance is sufficiently charged, the voltage across feed transistor Q1 is reduced to a value less than the limiting voltage, whereupon the current through feed transistor Q1 is allowed to increase to the current limit value.

The implementation of current limiter 110 shown in FIG. 3 uses many of the same components as current limiter 110 shown in FIG. 2; these components are designated with the same numerals as the corresponding components in FIG. 2. Current limiter 110 of FIG. 3 eliminates a resistor (R1) in series with the feed transistor (Q11), and hence reduces the DC impedance of circuit 110 effectively to zero. Otherwise, its functional characteristic is also represented by FIG. 4. This implementation substitutes an in-channel SENSEFET Q11 for transistor Q1 of FIG. 2. SENSEFET Q11 is a current-sensing power MOSFET, such as the device MLP2N06CL from Motorola, Inc. Its drain is connected through diode D1 to ring lead R, its source is connected to battery V1, its gate is connected through resistor R2 to battery V1, and its mirror is connected through resistor R4 to battery V1. This implementation further substitutes a protection transistor Q12 for protection transistor Q2 of FIG. 2. Transistor Q12 is a NPN transistor whose collector is connected to the gate of SENSEFET Q11, whose emitter is connected to battery V1, and whose base is connected via resistor R1 and diode D1 to ring lead R and via resistor R3 to the mirror of SENSEFET Q11.

To allow for selective (e.g., manual) turn-on and turn-off of current limiter 110, the gate of SENSEFET Q11 and the collector of protection transistor Q12 are connected across a resistor R15, an PNP transistor Q13, and a resistor R16 to an on/off control lead. The collector of transistor Q13 is connected through resistor R16 to on/off lead, its emitter is connected through resistor R15 to the gate of SENSEFET Q11 and the collector of protection transistor Q12, and its base is connected to ground GND. On/off lead has TTL-compatible signal levels: an "off" signal is 0V, and an "on" signal is 5V.

Alternatively, the selective turn on/off capability may be eliminated, in which case R16 and Q13 are eliminated and R15 connects to ring lead R.

Of course, various changes and modifications to the illustrative embodiment described above will be apparent to those skilled in the art. For example, the current limiter may comprise the complement, or dual, (e.g., the NPN version) of the circuit shown in FIG. 2 or 3. Or, it may be implemented via MOSFETs instead of bipolar transistors. Such changes and modifications can be made without departing from the spirit and the scope of the invention and without diminishing its attendant advantages. It is therefore intended that such changes and modifications be covered by the following claims.

What is claimed is:

1. A current-limiting circuit for a battery-feed circuit of a digital communications line, comprising:

a feed transistor for coupling a source of power to a lead of the digital communications line and limiting an amount of current flowing between the source of power and the lead to below a first value when a voltage across the feed transistor is below a second value;

a high-impedance circuit for coupling the source of power to the lead in parallel with the feed transistor; and a control transistor connected to the feed transistor and causing the feed transistor to supply an amount of current to the lead that is less than the first value and greater than a third value and inversely proportional to the voltage across the feed transistor when the voltage is above the second value and below a fourth value, and further causing the feed transistor to cease supplying current to the lead when the voltage is above the fourth value so that the high-impedance circuit supplies an amount of current to the lead that is less than the third value when the voltage is above the fourth value.

2. The current-limiting circuit of claim 1 wherein:

the control transistor turns off the feed transistor when the voltage is above the fourth value.

3. The current-limiting circuit of claim 1 wherein:

the control transistor partially turns off the feed transistor when the voltage is above the second value and below the fourth value.

4. The current-limiting circuit of claim 3 wherein:

the feed transistor is saturated when the voltage is below the second value, and effects a low-impedance connection between the power source and the lead.

5. The current-limiting circuit of claim 1 wherein:

the feed transistor effects a low-impedance connection between the power source and the lead when the voltage is below the second value; and the high-impedance circuit effects a high-impedance connection between the power source and the lead when the voltage is above the fourth value.

6. The current-limiting circuit of claim 1 wherein:

the high-impedance circuit is a resistive circuit.

7. The current-limiting circuit of claim 1 wherein:

the feed transistor includes a control input; and the control transistor is connected between the control input and either the lead or the source of power.

8. The current-limiting circuit of claim 1 wherein:

the control transistor and the feed transistor each includes a control input;

the control transistor is connected to the control input of the feed transistor; and the current-limiting circuit further includes circuitry connected to the control input of the control transistor for detecting the voltage across and the current-through the feed transistor.

9. The current-limiting circuit of claim 1 wherein:

the control transistor includes a control input; and the feed transistor comprises a current-sensing power MOSFET having a mirror output that is connected to the control input of the control transistor.

10. The current-limiting circuit of claim 1 wherein:

the feed transistor comprises a high-gain transistor having a collector resistively coupled to the lead, having a base resistively coupled to the source of power, and having an emitter coupled to the source of power; and the control transistor comprises a transistor having a collector coupled to the lead, having an emitter coupled to the base of the feed transistor, and having a base resistively coupled to the lead, the collector of the feed transistor, and the source of power.

11. The current-limiting circuit of claim 1 wherein:

the feed transistor comprises a SENSEFET having a source coupled to the source of power, having a drain coupled to the lead, having a gate resistively coupled to the source of power, and having a mirror; and the control transistor comprises a transistor having a collector coupled to the gate, having an emitter coupled to the source of power, and having a base resistively coupled to the lead, the mirror, and the source of power.

* * * * *